United States Patent [19]
Cook

[11] 3,810,301
[45] May 14, 1974

[54] METHOD FOR MAKING AN INTEGRATED CIRCUIT APPARATUS

[75] Inventor: Robert C. Cook, Pierrefonds, Quebec, Canada

[73] Assignee: Centre de Recherche Industrielle du Quebue, Ste.-Foy, Quebec, Canada

[22] Filed: Aug. 31, 1972

[21] Appl. No.: 285,496

[30] Foreign Application Priority Data
July 28, 1972 Canada........................148232

[52] U.S. Cl.................... 29/593, 29/574, 340/173 R
[51] Int. Cl. ........................................... H01l 17/00
[58] Field of Search..................... 29/593, 574, 577; 340/172.5, 173 R

[56] References Cited
UNITED STATES PATENTS
3,423,822   1/1969   Davidson et al......................29/577
3,715,735   2/1973   Moss..............................340/173 R Primary Examiner—Roy Lake
Assistant Examiner—J. W. Davie
Attorney, Agent, or Firm—Cushman, Darby & Cushman

[57] ABSTRACT

The method consists in subdividing an entire substrate into many independent and identical circuit arrays with each array containing an identical programmable section, in programming the first array to respond to a certain set of electrical impulses, in testing the array for electrical function: if the array is good, proceeding with the programming and testing of the programmable section of the second array using another set of electrical impulses; if the array is faulty, proceeding with the programming and testing of the programmable section of the second array with the same set of electrical impulses used for the previous faulty array; then, repeating the above programming and testing steps for the remaining circuit arrays of the substrate using different sets of electrical impulses; and then establishing connection between the system connect lines of each array.

7 Claims, 6 Drawing Figures

METHOD FOR MAKING AN INTEGRATED CIRCUIT APPARATUS

This invention relates to a method for making an integrated circuit apparatus and, more particularly, to a method thereof for the fabrication of memory systems in computers or other digital equipment.

The advantages of being able to eliminate the conventional chip-package processes for the fabrication of medium or large semi-conductor integrated circuit systems are well known in the art. It has been proposed that, instead of removing the imperfect chips from an integrated circuit substrate or wafer, the locations of the good ones be determined by tiny electronic probes that test each circuit to produce a monolithic system. As each good circuit is located and tested, its precise location on the wafer is recorded by a computer. Once the location of all the good circuits are recorded, the computer develops the wiring pattern that connects all the good circuits together. At the same time, the computer sets up data to produce the photo-mask that connects the good circuits. However, this approach has been found to be uneconomical, first, as a result of initial expense of dedicated computer and software. Furthermore each wafer requires the generation of a unique photo-resist mask, which is considered a major cost factor. Also, the inter-connect patterns are quite complex and photo-resist defects easily cause open or shorted metal lines resulting in the reject of the wafer.

Until now, the conventional method has been used: after all the chips have been tested on the wafer, a diamond scribe scores lines around every circuit chip and a vacuum pencil picks up the good circuit chips leaving the rejects; fine gold wires are then bonded to the miniature circuits which are packaged then mounted on printed circuits cards. The disadvantages of such approach are also well known in that large area chips must be used to minimize handling and packaging: also, the assembly of chips into integrated circuit packages and of integrated circuit packages onto printed circuit boards represent many process steps. Furthermore, memory chips and logic chips are assembled in separate packages. A special organization for the fabrication of random access memories (RAM) and read only memories (ROM) allows for maximum wafer utilization. However, unlike a serial memory, a RAM or ROM chip must recognize its own specific binary address. One method of implementing a wafer into a RAM is to organize the wafer with redundant chips. For each specific chip address there exists a number of chips and at least one of this number must be good in order to form a successful system. The various chips are located in separate sections of the wafer to maximize the chances of having at least one good chip for each address. The result is that for some addresses a given number of chips will respond and for other addresses another number of chips respond. This approach is not optimum from a manufacturing point of view for two reasons; first, in most cases more than one chip responds to a given address resulting in a waste of valuable wafer area, and, secondly, there are some cases in which for a particular address there is no good chip to respond resulting in the rejection of the wafer.

It is an object of the present invention to provide a method of making an integrated circuit apparatus where all of the good chips on the wafer are used.

It is also an object of this invention to provide a method for making integrated circuit apparatus which may be applied to serial, random access and read only memories.

It is also an object of the present invention to permit the fabrication of very inexpensive memory systems.

It is still a further object of the present invention to provide a method of selecting good chips and of rejecting bad chips without requiring complicated computerized test systems or the use of specially skilled labour.

Yet it is a further object of the present invention to provide a method which starts off with identical and independent circuit arrays and ends up with all the arrays responding to different electrical inputs.

The present invention therefore relates to a method for making an integrated circuit apparatus which comprises the steps of (a) providing a plurality of identical and independent circuit arrays formed on a substrate, each array containing an identical programmable section and system connect lines; (b) programming the programmable section of a first circuit array to respond to a predetermined set of electrical impulses; (c) testing the first array for electrical function to thereafter: (i) proceed with the programming and testing of the programmable section of a second circuit array if the first array is good, using a second predetermined set of electrical impulses; or, (ii) if the array is bad, proceed with the programming and testing of the programmable section of the second circuit array using the first predetermined set of electrical impulses; (d) repeating the above programming and testing steps for the remaining circuit arrays using different sets of electrical impulses; and (e) establishing connection of the system connect lines of the circuit arrays.

In one embodiment of the invention, the connection between a faulty array and its system connect lines is opened before proceeding with the programming and testing of a next array.

As another variant of this method, the location of a bad array may be memorized when detected and the programming and testing of the next array may be effected and so on whereby all the bad arrays are severed from the system connect lines after all the chips have programmed and tested.

The foregoing and other objects, features and advantages of the invention will be apparent from the more particular description of a preferred embodiment of the invention, as illustrated in the accompanying drawings, in which.

Figure 1:
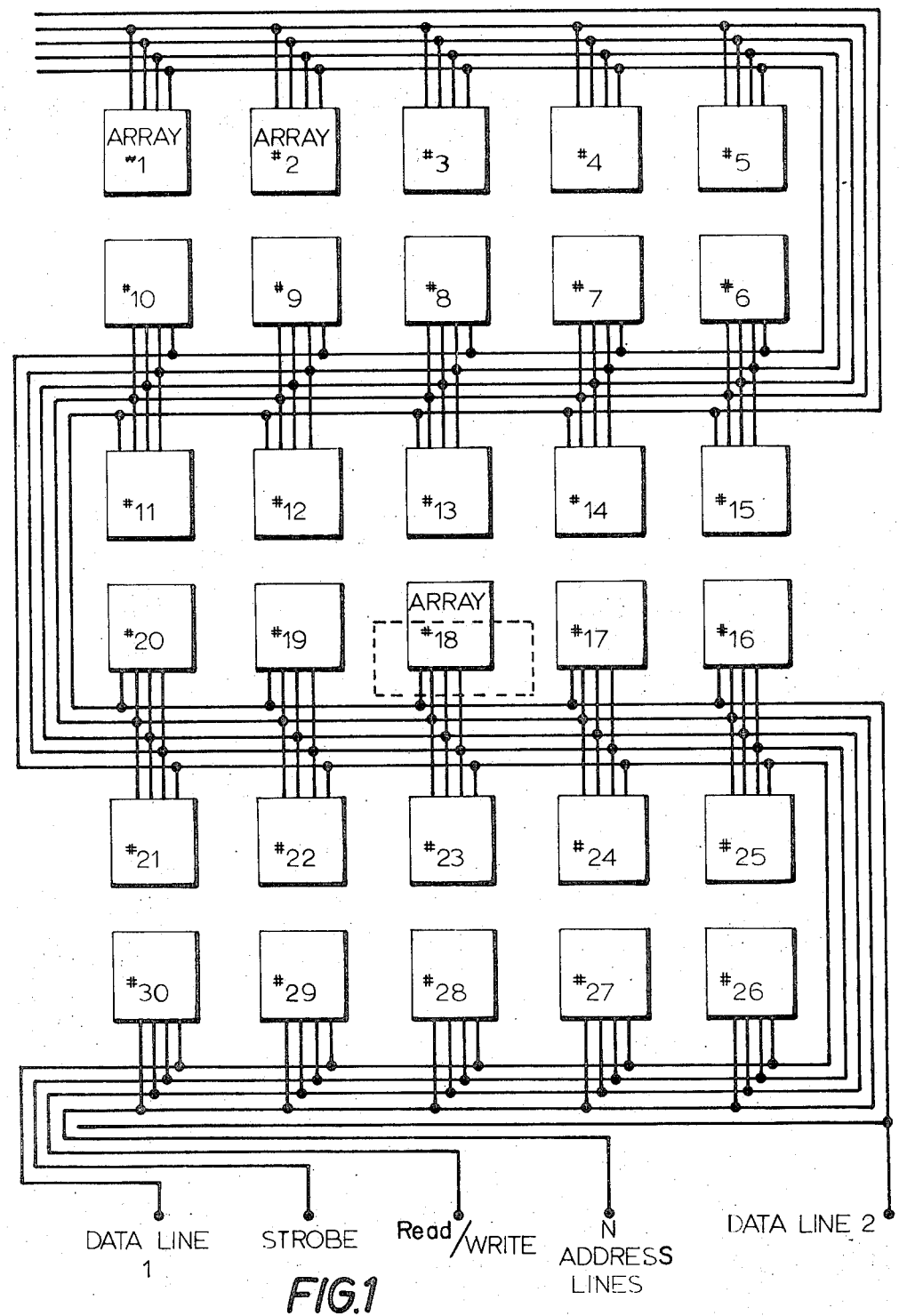
FIG. 1 is an overall view of a large section of a wafer showing a series of arrays interconnected.
Figure 2:
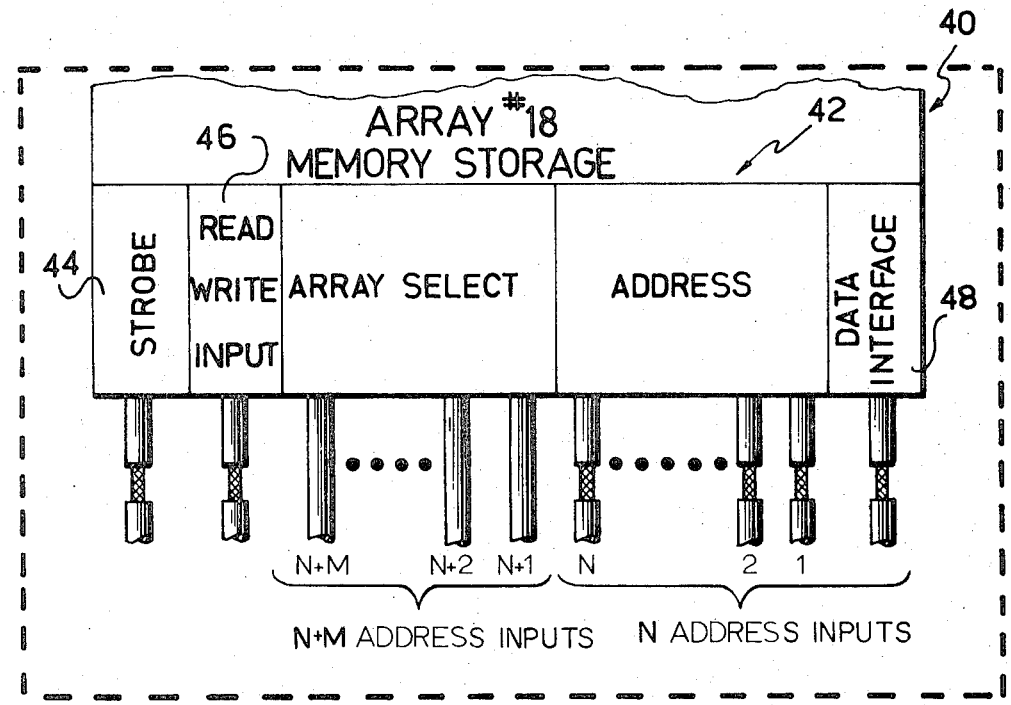
FIG. 2 is a detailed enlarged view of an array circuit made in accordance with the present invention.

The invention is described herein with reference to a preferred embodiment wherein the circuits are formed by a large scale integration technique and are of the monolithic type. Therefore, the overall view shown in FIG. 1 is a large section of a wafer or substrate of silicon on which a plurality of arrays (chips or clusters) numbered 1 through 30 are formed. The fabrication techniques of integrated circuits are well known in the art and will not be described. However, it is essential in the present invention that the circuitry of each array be made identical to that of all the other arrays. Each array includes a memory storage portion 40, an address portion 42, and other required circuitry such as the strobe input, the read-write input, the data interface, as illustrated by blocks 44, 46 and 48 in FIG. 2. A series of input terminals are connected to the respective blocks of each chip.

In accordance with the present invention, the first step is to subdivide the entire substrate into a series of independent and identical circuit arrays with each array containing an identical sub-circuit or address portion; the arrays being self-contained integrated circuits, will therefore function independently of the other arrays on the substrate. The use of redundant circuits or circuit elements is thereby eliminated and the present invention does not depend upon manufacturing yield.

The novel feature of the present invention is that the address portion of the array is programmable to respond to a predetermined set of electrical impulses. The address portion is programmed to recognize a specific address during the normal wafer probe step. This is accomplished through the use of fuse links, for example, and exclusive OR circuit forming part of the array select logic shown in FIG. 3. Once programmed, the address inputs are applied to the terminal numbered N+1 through N+M. It will be evident to those skilled in the art that there are other ways besides fusing to program the address portion of an array. Other examples include such means as burn-out by laser beam, severing by an abrasive tool, etc. The logic with its associated fuses permits the output to respond to a unique set of inputs where the inputs can have for example sixteen different combinations. In the case where there are four inputs, there are $2^4$ or 16 combinations. More or less inputs can be used to increase or decrease the number of respective combinations.

The fuses permit the logic array to be responsive to only one combination of input levels. For example let +V equal logic 1 and the ground symbol equal a logic 0. Opening all fuses associated with +V will cause input A+1 through A+B to be permanently held at the logic 0. This corresponds to programming the logic array to be responsive only if inputs N+1 through N+M are also logic 0. Unless input A+1 equals input N+1, input A+2 equals input N+2, etc., the output remains a logic 0 (non-responsive). If the inputs respectively equal each other, the output becomes a logic 1 (responsive). The fuses permit one input of each exclusive OR gate (not shown) to be permanently defined. The resulting sequence of logics 1's, 0's represent an address or a unique input pattern; if the other inputs of the exclusive OR gate correspond exactly, the output changes its state from a logic 0 to a logic 1 indicating that the input pair of every exclusive OR gate is the same. The logic array is therefore a general purpose comparator which can be programmed to respond to only a unique combination of inputs.

Figure 3:
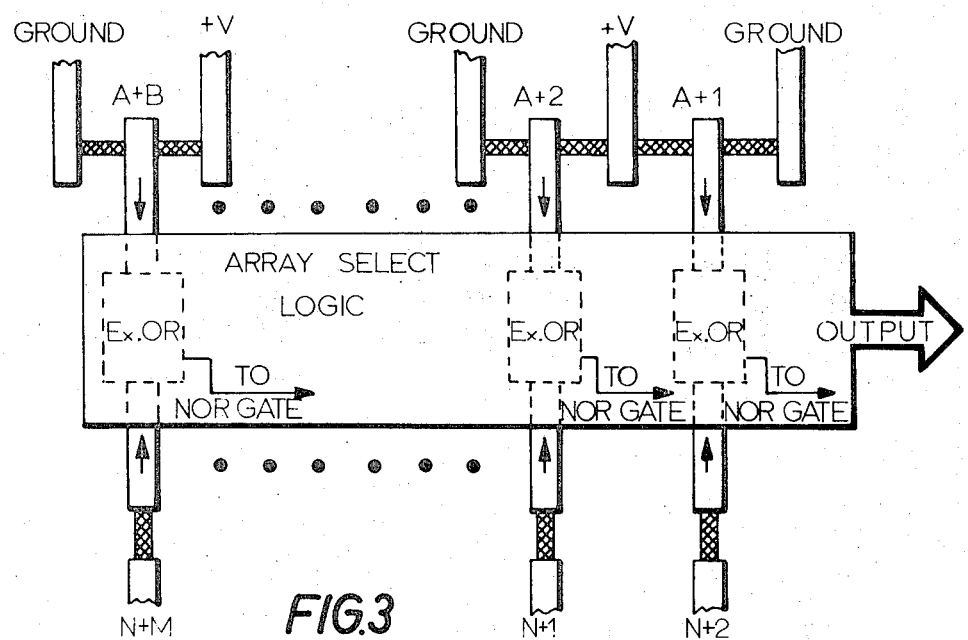
FIG. 3 is an enlarged detailed view of the array select logic with its associated connect lines of the address portion of one array.

The present invention makes use of this property to enable identical arrays of logic OR memory on a wafer to be uniquely selected by employing the fuse and logic combination of FIG. 3 into each array. In the example given, 16 identical arrays can be uniquely defined or selected by a four bit input pattern. One, and only one of 16 arrays, can be selected for whatever purpose without affecting the other fifteen. If N exclusive OR gates are used in the selection logic, then $2^N$ arrays can be given a unique identity.

Although the above has been described in relation to an exclusive OR gate, it will be evident to those skilled in the art that an equivalence gate (an inverting exclusive OR gate) and a NAND gate may be used in place of the NOR gate. In this case, there is an input match, i.e., all inputs pairs being equal, the output becomes a logic 0. No match results in an output being a logic 1. This in effect is the dual of FIG. 3.

It will be evident to those skilled in the art that there are other circuits to do the programming in addition to those mentioned above.

The use of fusible conductors in conjunction with logic comparators for the purpose of establishing a unique identity to otherwise identical arrays of logic OR memory on a semi-conductor is novel. This circuit technique and procedure also remove the need for positional or two-dimensional redundancy of logic arrays to assure that there are sufficient good arrays to achieve the desired wafer function. This technique is therefore efficient and permits economically feasible semi-conductor wafer systems or functions to be manufactured.

If exclusive OR gates and a NAND gate are used as the comparator, the output (normally a logic 1) will go to a logic 0 if the one's complement of the programmed pattern is present on the input lines. This occurs when every exclusive OR input pair does not match. Comparing complements can also be achieved using equivalence gates and a NOR gate. When the inputs represent the one's complement of the program pattern, the output which is normally 0 will become a logic 1. Again, one logic set is the dual of the other.

Therefore, the selected state can be defined when inputs equal the programmed state or its inverse. In general, for each $2^N$ possible program states, there can be defined only one set of input conditions which will cause the output to change. The programmed pattern can be uniquely compared to a totally different input pattern. In the simplest case, both patterns equal each other. In the general case, they do not necessarily equal each other. In each case, for each programmed pattern there is only one input combination the logic will accept.

Once the programmable section of a first circuit array is programmed, it is tested. If the array is good, then the programmable section of the next array is programmed using a different address for this array. However, if the result of the test on the first array indicates that it is faulty, all the connections between the array and the system connect lines are opened. The technique for opening electrical conductors may involve the conventional method, such as fusing, laser beam, etc. The following array is then programmed; however, in this case, it is programmed with the same address as that used for programming the preceding faulty array.

The above-described tests are then repeated for all the arrays on the wafer.

As a variant of the above described method the locations of all faulty arrays may be memorized when detected and the faulty arrays are disconnected only after all the arrays have been programmed and tested.

Figure 4:
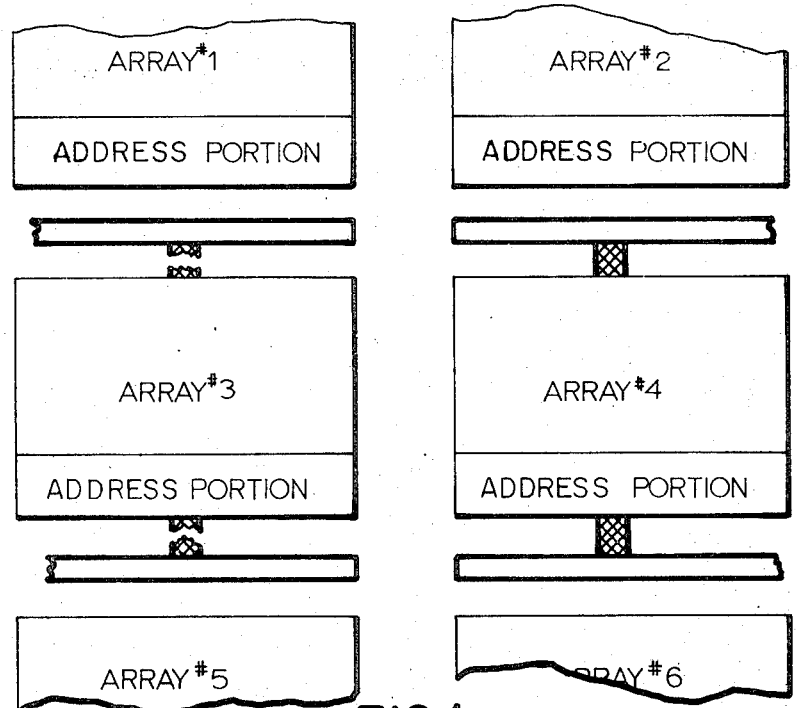
FIG. 4 is a schematic view showing two adjacent arrays with one array considered faulty and having opened conductors, the other array considered good.
Figure 5:
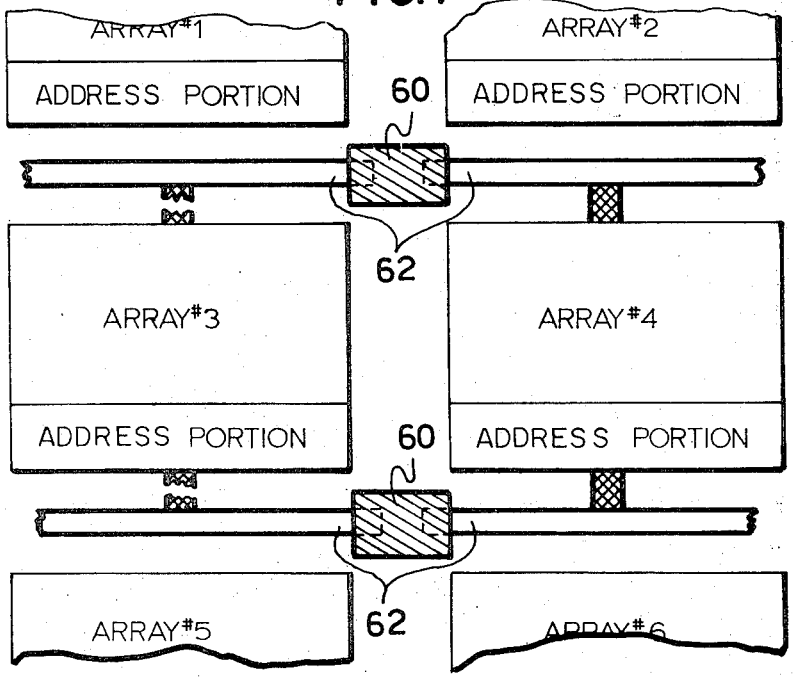
FIG. 5 is a schematic representation illustrating the connection of the conductors of adjacent arrays.
Figure 6:
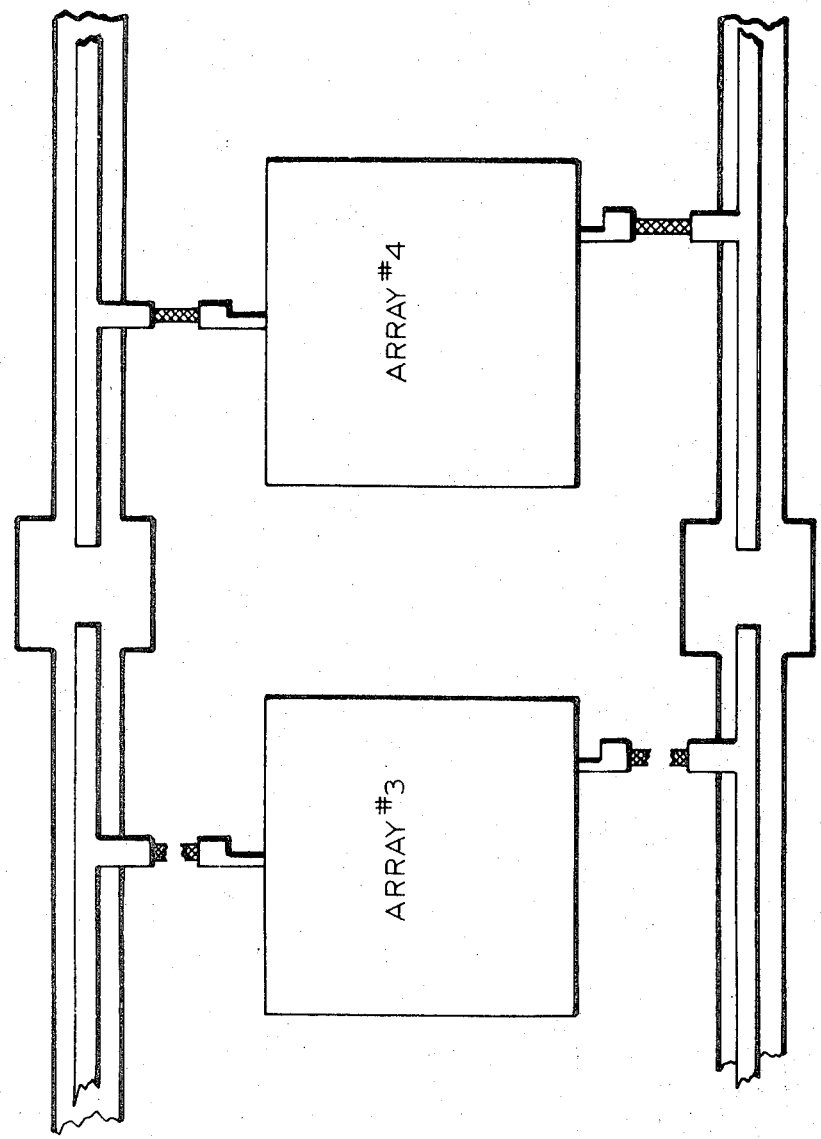
FIG. 6 illustrates a second metallization process.

FIG. 4 shows two arrays in successive order where one is considered good and the other faulty. A conductive material 60 is placed in such a way as to connect together all the system connect lines, represented by bus 62. FIG. 5 shows another method of interconnecting the lines of each array and consists in providing a second metallization thereby increasing the yield percentage.

The wafer is then mounted onto a package and standard wire bonding may be used for connection to external leads. The mounting can be effected by means of conductive silver or gold epoxy. Again, it will be evident to those skilled in the art that other methods may be used.

The above described system can be applied to any semi-conductive planar process: CMOS, PMOS, NMOS, silicon gate, bipolar, CCD, etc. Almost any metal, even aluminum, can be used for the fuse links. However, tantalum is preferred because as it becomes hot due to current flow, instead of vaporising, it merely oxidizes to become an insulator.

A special organization for the fabrication of random access memories (RAM) or read only memories (ROM) allows for maximum wafer utilization. Unlike a serial memory, a RAM or ROM chip must recognize its own specific binary address. For a typical RAM size of 4096 bits where each chip contains 128 bits, there is 5 chips select inputs to identify one of 32 chips. Each exclusive OR circuit, using CMOS, requires only 10 transistors and each static memory cell contains 6 transistors. Thus, for a 128 bit chip there is 768 memory transistors and only 50 chip decode transistors. Therefore, the chip decode adds very little to the chip area; in fact, the addressing scheme eliminates much of the peripheral logic required by conventional RAM integrated circuits.

The probing sequence is also quite simple for the fabrication of a wafer RAM using the present technique. The number of probes required is only 15 therefore, a very ordinary prober can be used. The stsps are: (a) all probes make contact to the chip pad and the appropriate fuses are blown to program the chips; (b) the chip is tested in the standard fashion; (c) if good, the probes move to the next chip which is programmed at a different address; or (d) if bad, the input-output and supply links are opened and the probes move to the next chip and the same address is programmed. It will be expected from those skilled in the art to conceive a very simple controller which would facilitate the chip programming. A bad chip signal from the tester would cause the controller to stay at the same address. A good chip signal would cause the controller to move to the next address.

From the above, the application of the present invention to the fabrication of serial, random access and read only memories it is shown to be both readily implemented and economically competitive. In these cases the chips are repetitive and functionally identical. However, in some cases it will be economical to form a more complex wafer system containing both memory and peripheral logic. The wafer would be partitioned into sections with repetitive memory chips and redundant logic chips.

Although the invention has been described above in relation to one specific form of the invention, it will be evident to the man skilled in the art that it may be modified and refined in various ways. It is therefore wished to have it understood that the present invention is not limited in interpretation except by the terms of the following claims.

The embodiments of the invention in which an exclusive property or privilege is claimed are defined as follows:

1. A method for making integrated circuits apparatus comprising the steps of
    a. providing a plurality of identical and independent circuit arrays formed on a substrate, each said array containing a programmable section having conductive paths that can be selectively opened for establishing a unique array identity and system connect lines;
    b. programming the programmable section by selectively opening said conductive paths of a first circuit array to respond to a predetermined set of electrical impulses and so establish a unique array identity;
    c. testing said first array to thereafter
        i. proceed with the programming of the programmable section of a second circuit array and testing said second circuit array, if said first array is good, using a second predetermined set of electrical impulses to establish a unique array identity; or
        ii. proceed with the programming of the programmable section of a second circuit array and testing said second circuit array, if said first array is faulty, using said first predetermined set of electrical impulses to establish an array identity identical with said unique array identity of said faulty first array;
    d. repeating the above programming and testing steps for the remaining circuit arrays using different sets of electrical impulses;
    e. establishing connection of the system connect lines of the circuit arrays, and
    f. opening the connection between faulty arrays and system connect lines.

2. A method as defined in claim 1 wherein said step of opening the connection between faulty arrays and system connect lines includes opening the connection between a faulty array and its system connect lines before proceeding with the programming and testing of a next array.

3. A method as defined in claim 1 wherein said step of opening the connection between faulty arrays and system connect lines includes opening the connection between faulty arrays and their associated system connect lines after all the chips have been programmed and tested.

4. A method as defined in claim 3 wherein the location of a faulty array is memorized.

5. A method as defined in claim 1 further comprising the step of a first metallization for connecting all the associated system connect lines of each array.

6. A method as defined in claim 5 further comprising a second metallization to thereby increase yield percentage.

7. A method for making integrated circuits apparatus comprising the steps of
    a. providing a plurality of identical and independent circuit arrays formed on a substrate, each said array containing a programmable section comprising a plurality of fusible links and a logic comparator for establishing a unique array identity to an otherwise identical array and system connect lines;

b. programming the programmable section of a first circuit array to respond to a predetermined set of electrical impulses by opening selectable fusible links to give said first array a unique identity;

c. testing said first array to thereafter
   i. proceed with the programming of the programmable section of a second circuit array and testing said second circuit array, if said first array is good, using a second predetermined set of electrical impulses by opening selectable fusible links to give said second array a unique identity; or
   ii. proceed with the programming of the programmable section of a second circuit array and testing said second circuit array, if said first array is faulty, using said first predetermined set of electrical impulses by opening fusible links corresponding to those opened for said first array to give said second array an identity identical to said first faulty array;

d. repeating the above programming and testing steps for the remaining circuit arrays using different sets of electrical impulses and opening selectable fusible links;

e. establishing connection of the system connect lines of the circuit arrays, and f. opening the connection between faulty arrays and system connect lines.

* * * * *